(12) United States Patent
McClain

(10) Patent No.: US 8,261,698 B1
(45) Date of Patent: Sep. 11, 2012

(54) ANIMAL/PET CARRIER SYSTEM

(76) Inventor: Jamel A. McClain, Tampa, FL (US)

( * ) Notice: Subject to any disclaimer, the term of this patent is extended or adjusted under 35 U.S.C. 154(b) by 0 days.

(21) Appl. No.: 13/077,377

(22) Filed: Mar. 31, 2011

(51) Int. Cl.
*A01K 1/03* (2006.01)
(52) U.S. Cl. ......... 119/501; 119/497
(58) Field of Classification Search ........... 119/501, 119/497, 496, 482; 190/100, 102, 110, 111; 150/100, 127
See application file for complete search history.

(56) References Cited

U.S. PATENT DOCUMENTS

| | | | |
|---|---|---|---|
| 4,050,493 A * | 9/1977 | Cho | 150/106 |
| 5,123,467 A * | 6/1992 | Steinberg | 150/106 |
| 5,357,900 A | 10/1994 | Ho | |
| 5,409,152 A | 4/1995 | Trevino | |
| 5,967,090 A | 10/1999 | Hui | |
| 6,076,485 A | 6/2000 | Peeples et al. | |
| 6,200,243 B1 * | 3/2001 | Meranto | 482/105 |
| 6,345,751 B1 * | 2/2002 | Elliot | 224/646 |
| 6,380,856 B1 * | 4/2002 | Johnson et al. | 340/571 |
| D469,952 S | 2/2003 | Daglow et al. | |
| 6,769,588 B2 * | 8/2004 | Zheng | 224/576 |
| 7,090,076 B2 * | 8/2006 | Hartstein et al. | 206/320 |
| 7,438,022 B2 | 10/2008 | Mirsky | |
| 8,113,148 B2 * | 2/2012 | Chem | 119/500 |
| 8,146,722 B1 * | 4/2012 | Moreno et al. | 190/18 A |
| 2003/0127060 A1 | 7/2003 | Yeung | |
| 2007/0087652 A1 | 4/2007 | Hsu | |
| 2008/0184941 A1 | 8/2008 | Hai et al. | |
| 2008/0216760 A1 | 9/2008 | Cannon et al. | |

* cited by examiner

*Primary Examiner* — Yvonne Abbott

(57) ABSTRACT

An animal pet carrier system comprising a bag having a door for the pet to access the bag, wherein at least a portion of the door comprises a mesh, and wherein the door can be temporarily closed to secure the pet in the bag; a speaker system secured to an interior side of the bag, an audio connector wire having a first connector end and a second connector end, the first connector end operably connects to the speaker system; a pocket disposed on the bag, wherein the pocket is for storing a digital audio player, and wherein the second connector end operably connects to the digital audio player.

8 Claims, 5 Drawing Sheets

(Back ISO View)

(Back ISO View)

(Front ISO View)

(Back ISO View)

(Top View)

(Detail View)

ANIMAL/PET CARRIER SYSTEM

BACKGROUND OF THE INVENTION

The present invention is directed to an animal/pet carrier system. The animal/pet carrier system of the present invention provides a more calming and comfortable way of traveling for a pet.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
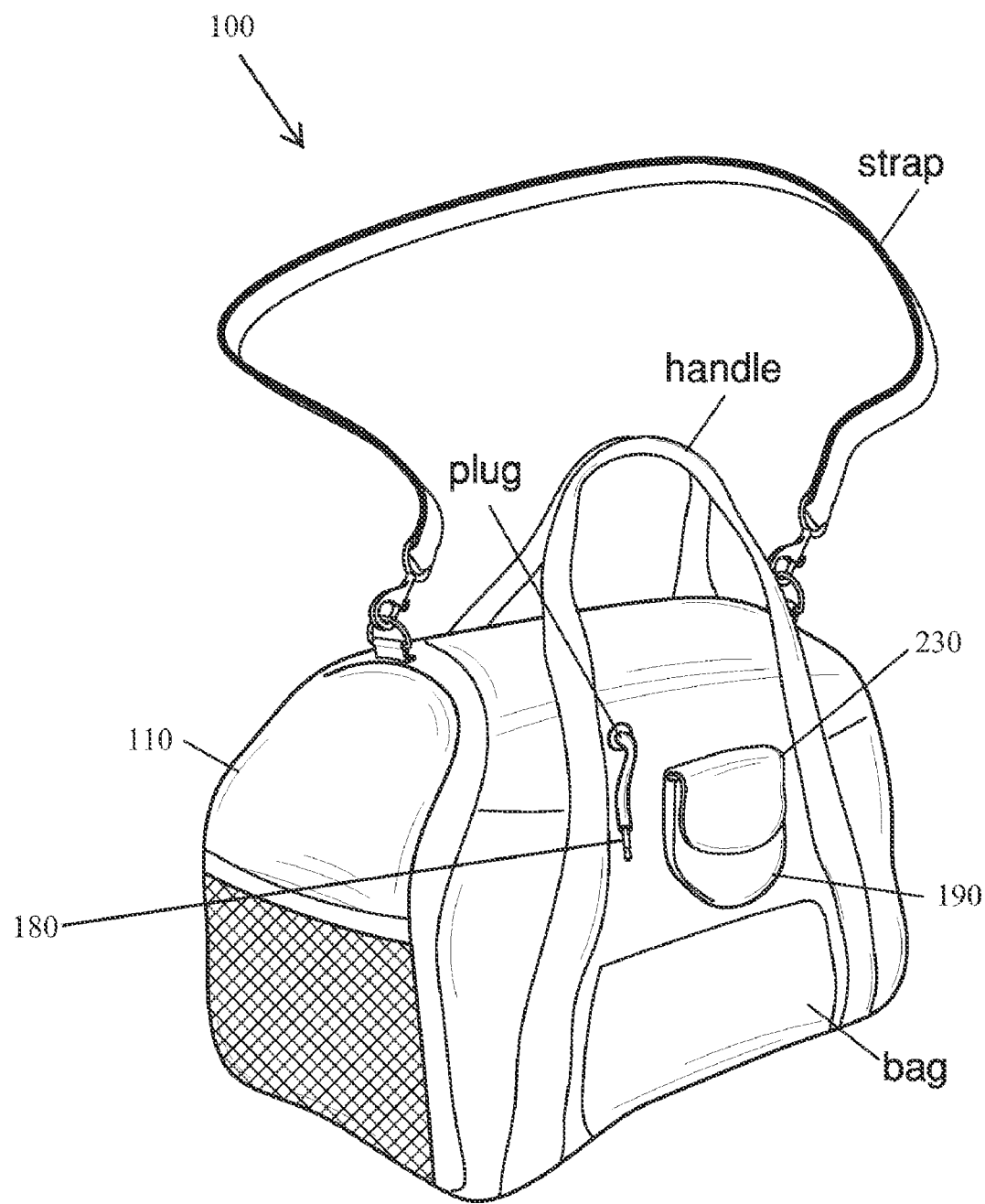
FIG. 1 shows a perspective view of an animal/pet carrier system.
Figure 2:
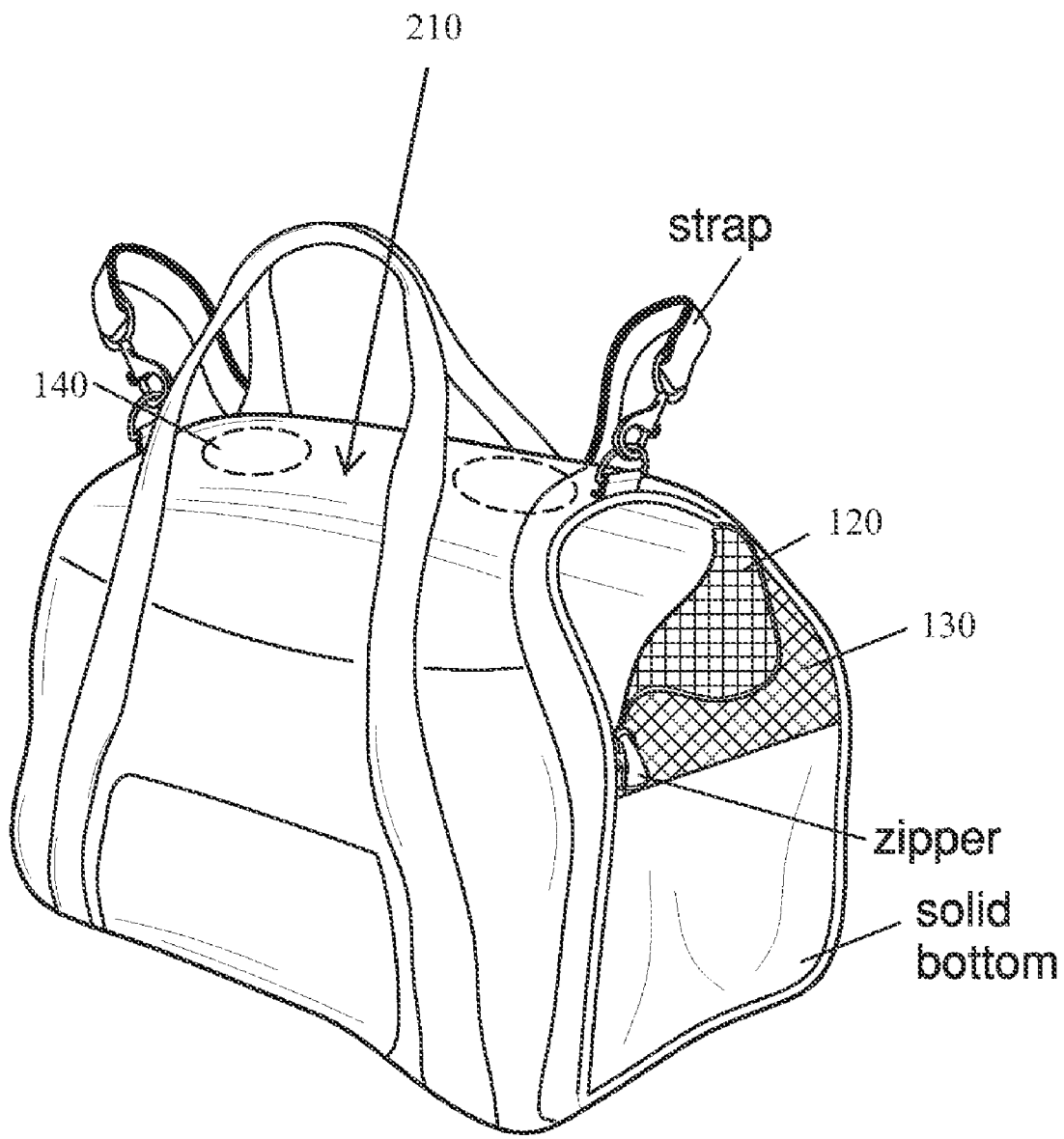
FIG. 2 shows a front perspective view of an animal/pet carrier system.
Figure 3:
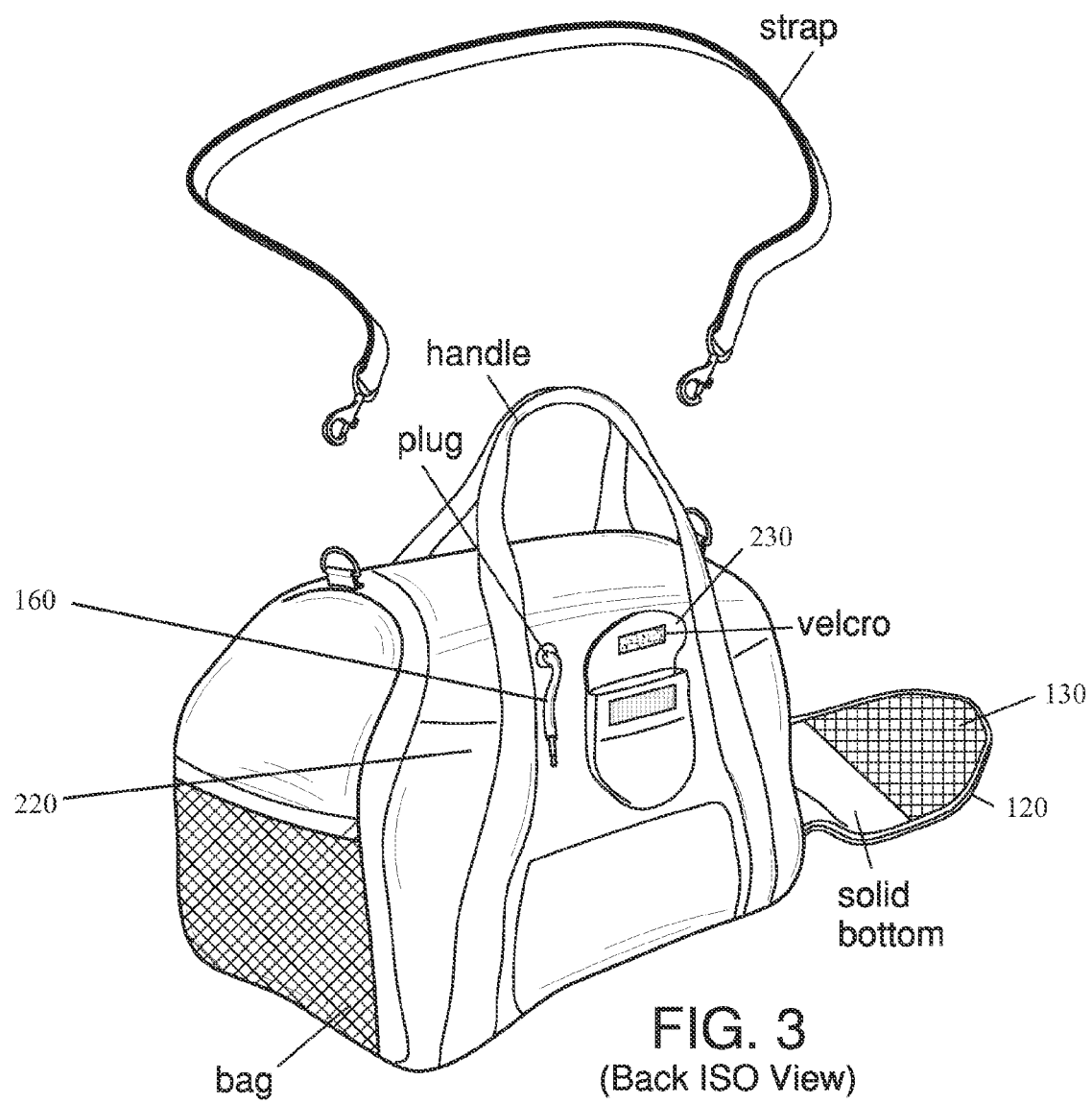
FIG. 3 shows a back perspective view of an animal/pet carrier system.
Figure 4:
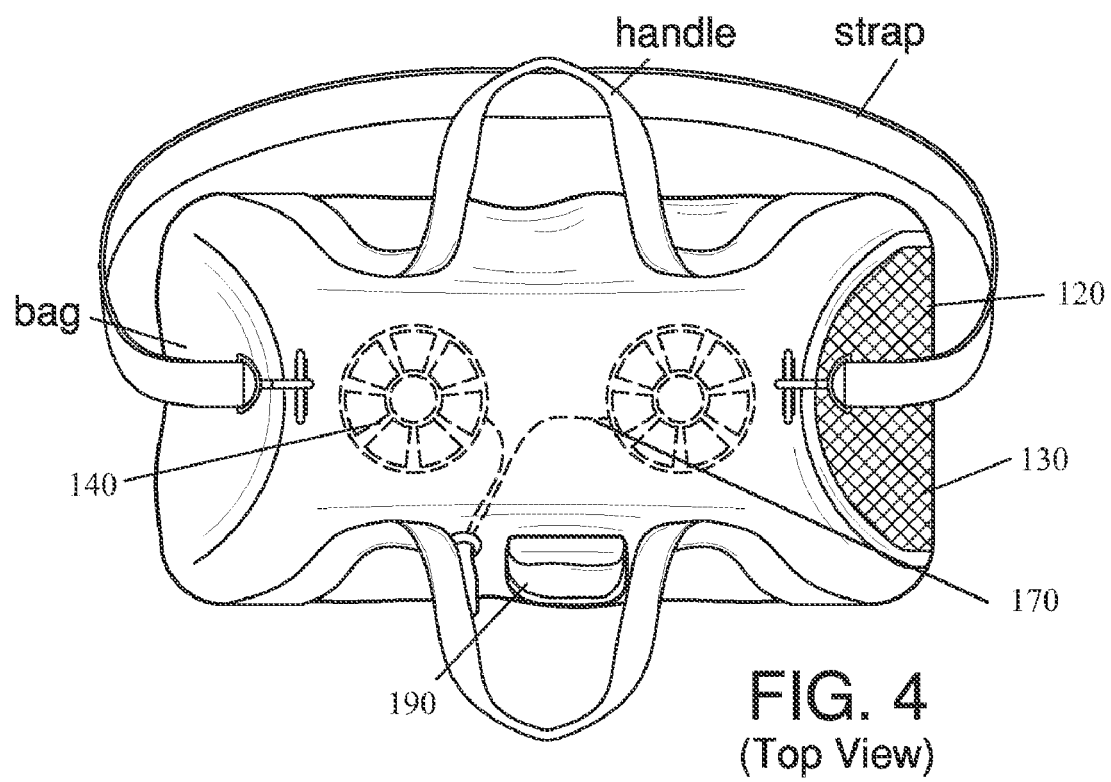
FIG. 4 shows a top view of an animal/pet carrier system.
Figure 5:
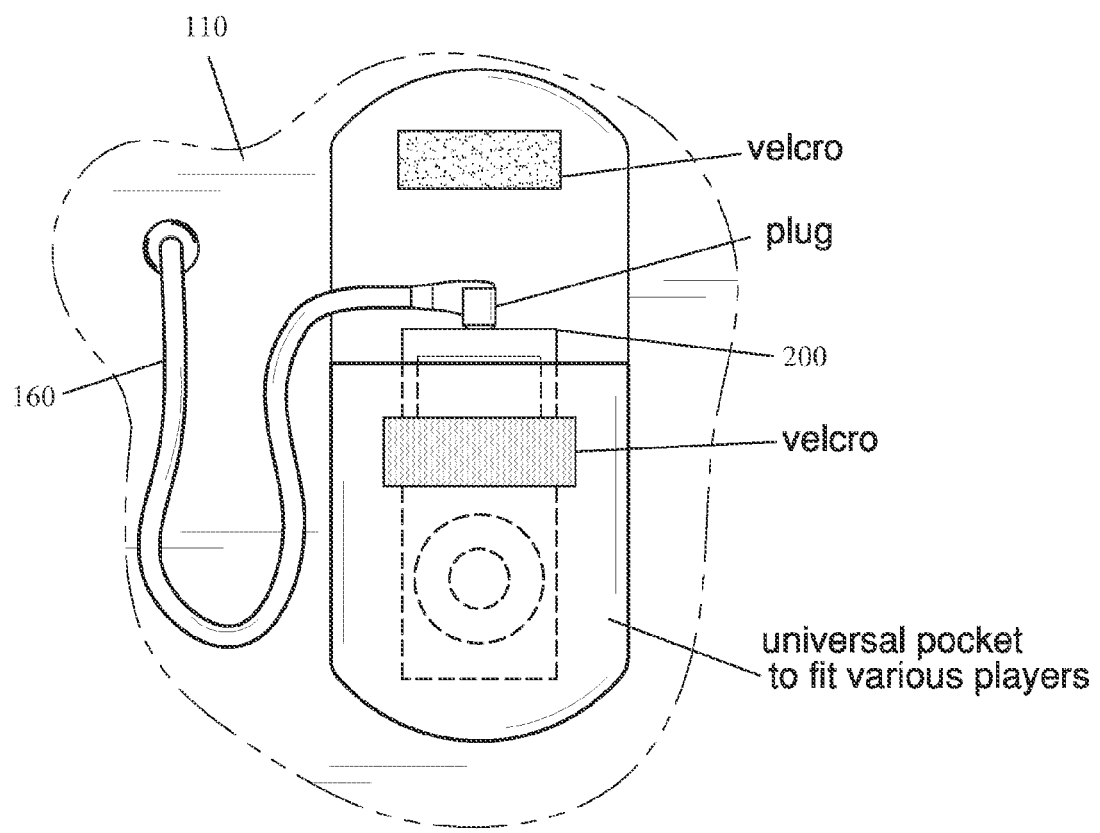
FIG. 5 shows an exploded view of the pocket in use on the animal/pet carrier system.

Referring now to FIGS. 1-5, the present invention features an animal/pet carrier system 100 comprising a bag 110 having a door 120 for the pet to access the bag, wherein at least a portion of the door comprises a mesh 130, and wherein the door can be temporarily closed to secure the pet in the bag.

The system further comprises a speaker system 140 secured to an interior side of the bag, an audio connector wire 160 having a first connector end 170 and a second connector end 180. The first connector end operably connects to the speaker system. The system further comprises a pocket 190 disposed on the bag, wherein the pocket is for storing a digital audio player 200, and wherein the second connector end operably connects to the digital audio player. The speakers in the system would make pets feel more comfortable and relaxed during travelling by either playing music or listening to pre-recorded audio of the pet's owner.

In some embodiments, the speaker system is secured to a top portion 210 of the interior side of the bag, so that sound coming out of the speaker would primarily remain within the interior side of the bag.

In some embodiments, the audio connector wire is threaded through the bag and the second connector end is available on an exterior 220 of the bag.

In some embodiments, the pocket is disposed on the exterior side of the bag. In some embodiments the pocket is disposed on the interior side of the bag. In some embodiments, the pocket is disposed on the exterior side of the bag, and wherein the pocket further comprises a flap 230 that can temporarily seal up the pocket to secure the digital audio player therein.

In some embodiments, the digital audio player plays music for the pet for soothing the pet. In some embodiments, the digital audio player plays a recording of a pet owner's voice for soothing the pet.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An animal pet carrier system (100) comprising:
   (a) a bag (110) having a door (120) for the pet to access the bag, wherein at least a portion of the door comprises a mesh (130), and wherein the door can be temporarily closed to secure the pet in the bag;
   (b) a speaker system (140) secured to an interior side of the bag,
   (c) an audio connector wire (160) having a first connector end (170) and a second connector end (180), the first connector end operably connects to the speaker system;
   (d) a pocket (190) disposed on the bag, wherein the pocket is for storing a digital audio player (200), and wherein the second connector end operably connects to the digital audio player.

2. The system of claim 1 wherein the speaker system is secured to a top portion (210) of the interior side of the bag, so that sound coming out of the speaker would primarily remain within the interior side of the bag.

3. The system of claim 1 wherein the audio connector wire is threaded through the bag and the second connector end is available on an exterior (220) of the bag.

4. The system of claim 1 wherein the pocket is disposed on the exterior side of the bag.

5. The system of claim 1 wherein the pocket is disposed on the interior side of the bag.

6. The system of claim 1 wherein the pocket is disposed on the exterior side of the bag, and wherein the pocket further comprises a flap (230) that can temporarily seal up the pocket to secure the digital audio player therein.

7. The system of claim 1 wherein the digital audio player plays music for the pet for soothing the pet.

8. The system of claim 1 wherein the digital audio player plays a recording of a pet owner's voice for soothing the pet.

\* \* \* \* \*